US009733131B2

(12) United States Patent
Ewing et al.

(10) Patent No.: US 9,733,131 B2
(45) Date of Patent: Aug. 15, 2017

(54) THERMOCOUPLE

(71) Applicant: Weston Aerospace Limited, Farnborough, Hampshire (GB)

(72) Inventors: James Ewing, Farnborough (GB); Daniel Loveless, Farnborough (GB)

(73) Assignee: WESTON AEROSPACE LIMITED, Farnborough, Hampshire (GB)

( * ) Notice: Subject to any disclaimer, the term of this patent is extended or adjusted under 35 U.S.C. 154(b) by 446 days.

(21) Appl. No.: 14/311,601

(22) Filed: Jun. 23, 2014

(65) Prior Publication Data
US 2014/0376593 A1    Dec. 25, 2014

(30) Foreign Application Priority Data

Jun. 24, 2013 (GB) .................................. 1311174.5

(51) Int. Cl.
*G01K 7/02* (2006.01)
*G01K 1/12* (2006.01)
(Continued)

(52) U.S. Cl.
CPC .................. *G01K 7/02* (2013.01); *G01K 1/12* (2013.01); *G01K 1/20* (2013.01); *G01K 7/04* (2013.01);
(Continued)

(58) Field of Classification Search
CPC .................................. G01K 1/12; G01K 7/02
(Continued)

(56) References Cited

U.S. PATENT DOCUMENTS 2,975,225 A * 3/1961 Barbieri .................... G01K 1/12
                                                        136/233
3,167,956 A * 2/1965 Grey ...................... G01K 17/10
                                                        374/148
(Continued)

FOREIGN PATENT DOCUMENTS

CN       2599552 Y  *  1/2004
EP       0989393 A2    3/2000
(Continued)

OTHER PUBLICATIONS

Search Report mailed Dec. 23, 2013 for co-pending priority GB Pat. App. No. 1311174.5, filed Jun. 24, 2013, 4 pages.
(Continued)

*Primary Examiner* — Gail Kaplan Verbitsky
(74) *Attorney, Agent, or Firm* — Fredrikson & Byron, P.A.

(57) ABSTRACT

A cooled thermocouple arrangement (1) including a thermocouple (2) comprising two wires (3,4) joined at a first sensing end (5) to define a hot thermocouple function. At least a portion of the wires (3,4) are in thermal communication with a cooling arrangement, and the cooling arrangement has an inlet (14) for coolant and an outlet (15) for coolant. The thermocouple probe arrangement (1) includes a first inlet temperature sensor (21) for determining the temperature of the coolant as it enters the cooling arrangement, and a flow rate sensor (20) for determining the flow rate of coolant passing through the cooling arrangement. The thermocouple probe arrangement (1) includes connectors for connecting the outputs from the thermocouple (2), first inlet temperature sensor (21) and the flow rate sensor (20) to a correction data processor (23) whereby the data processor can correct the temperature sensed by the thermocouple to take account of the effect of the cooling arrangement. The pair of thermocouple wires (3,4) are arranged inside a sheath (Continued)

or casing, and a cooling jacket (12) is provided around the thermocouple probe. The cooling jacket (12) includes a pair of concentric tubes (16,17) defining a return coolant circuit from the end of the probe proximal the connectors (8), to a portion of the probe distal from the connectors, and then back to the proximal end (8) of the probe, and the portion of the thermocouple probe containing the sensing end (5) of the thermocouple projects from the distal end of the cooling jacket (12).

14 Claims, 4 Drawing Sheets

(51) Int. Cl.
*G01K 7/04* (2006.01)
*G01K 13/02* (2006.01)
*G01K 1/20* (2006.01)

(52) U.S. Cl.
CPC ......... *G01K 13/02* (2013.01); *G01K 2205/00* (2013.01)

(58) Field of Classification Search
USPC ......... 374/4, 5, 29, 166, 137, 179, 163, 208, 374/139, 142, 143, 141, 1; 136/200
See application file for complete search history.

(56) References Cited

U.S. PATENT DOCUMENTS

| | | | | |
|---|---|---|---|---|
| 3,301,715 A * | 1/1967 | Gerrard | ................... | G01K 1/12 136/217 |
| 3,453,880 A * | 7/1969 | O'Connor | ......... | G01N 25/4873 374/35 |
| 3,535,165 A | 10/1970 | Zellner | | |
| 3,769,792 A | 11/1973 | Grey | | |
| 3,774,441 A * | 11/1973 | Dorst | ................... | G01N 25/04 374/16 |
| 4,480,930 A * | 11/1984 | DeZubay | .............. | G01K 13/02 374/134 |
| 4,724,428 A * | 2/1988 | Brown, Jr. | ............. | G01K 7/026 136/232 |
| 4,860,603 A * | 8/1989 | Russoniello | ....... | G01N 27/4077 73/866.5 |
| 5,076,103 A * | 12/1991 | Lagen | .................... | G01P 5/165 73/147 |
| 5,104,234 A | 4/1992 | Falk et al. | | |
| 5,184,894 A * | 2/1993 | Falk | ....................... | G01K 1/125 136/234 |
| 5,312,186 A * | 5/1994 | Swan | ..................... | G01K 13/12 374/143 |
| 5,348,395 A * | 9/1994 | Corr, II | .................... | G01K 1/08 374/135 |
| 6,270,253 B1 | 8/2001 | Keller | | |
| 6,280,083 B2 | 8/2001 | Kita et al. | | |
| 6,702,458 B2 * | 3/2004 | Sirand | ................... | F23D 14/725 136/200 |
| 6,857,776 B2 | 2/2005 | Park | | |
| 7,138,901 B2 * | 11/2006 | Seshadri | .................. | G01K 7/22 338/22 R |
| 8,250,924 B2 * | 8/2012 | Hedtke | .................. | G01H 11/08 73/660 |
| 8,992,081 B2 * | 3/2015 | Ireland | ................... | G01K 13/02 374/144 |
| 2004/0045813 A1* | 3/2004 | Kanno | ..................... | C25D 5/18 204/242 |
| 2008/0229848 A1* | 9/2008 | Bruzzi | ................. | G01N 1/2247 73/864.33 |
| 2011/0264084 A1* | 10/2011 | Reid | ...................... | A61B 18/02 606/23 |
| 2011/0317740 A1* | 12/2011 | Ireland | ................. | G01K 13/028 374/179 |

FOREIGN PATENT DOCUMENTS

| | | |
|---|---|---|
| EP | 1014059 A1 | 6/2000 |
| EP | 2568115 A1 | 3/2013 |
| FR | 2771505 B1 | 6/2000 |
| GB | 2100003 A | 12/1982 |
| GB | 2405967 A | 4/2005 |
| JP | 06241050 A * | 8/1994 |

OTHER PUBLICATIONS

European Search Report and Annex to the European Search Report on European Patent Application No. EP14173345, Jan. 19, 2015, 7 pages, Euopean Patent Office, the Hague.

* cited by examiner

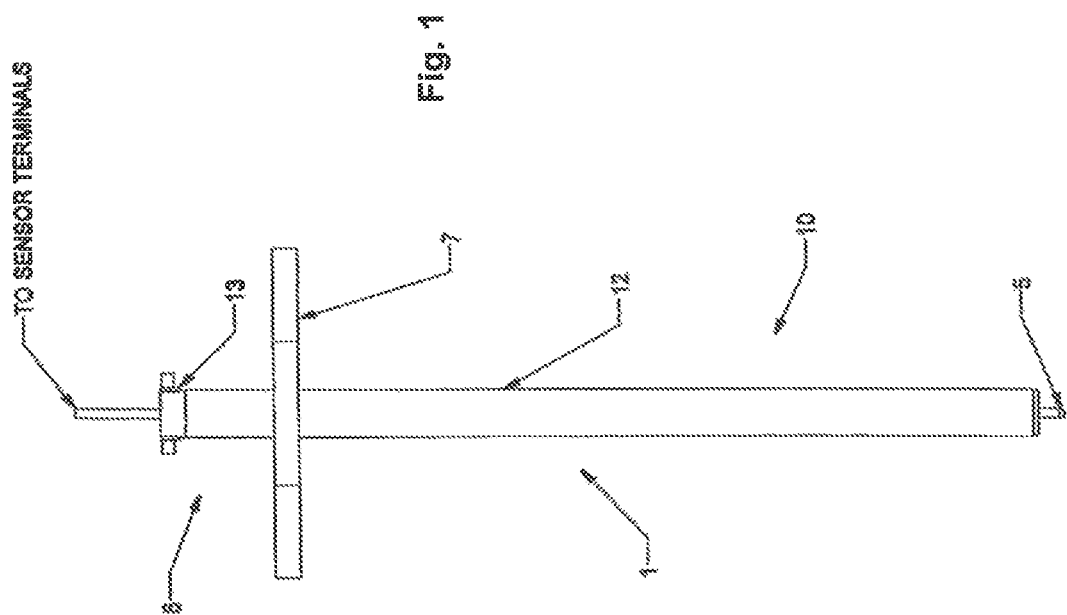

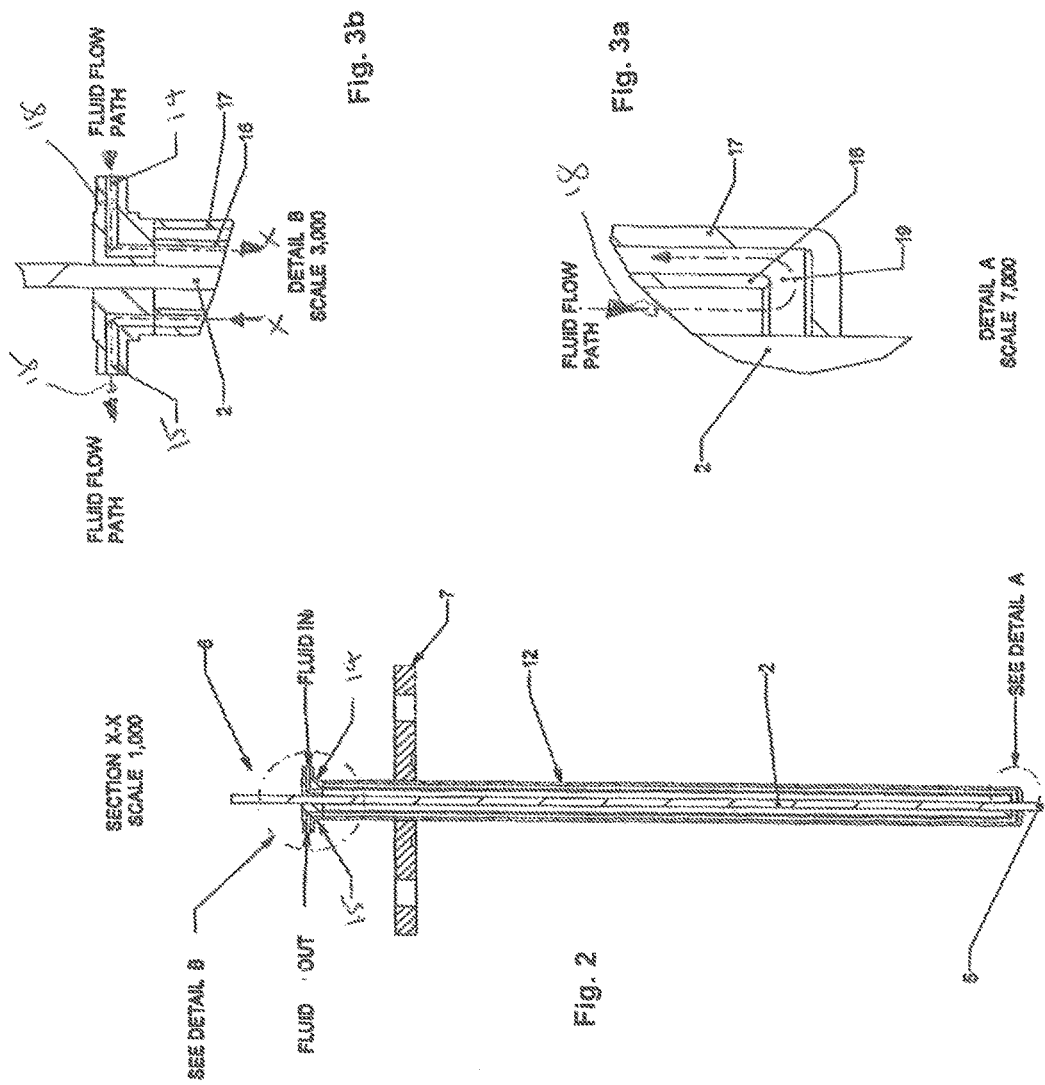

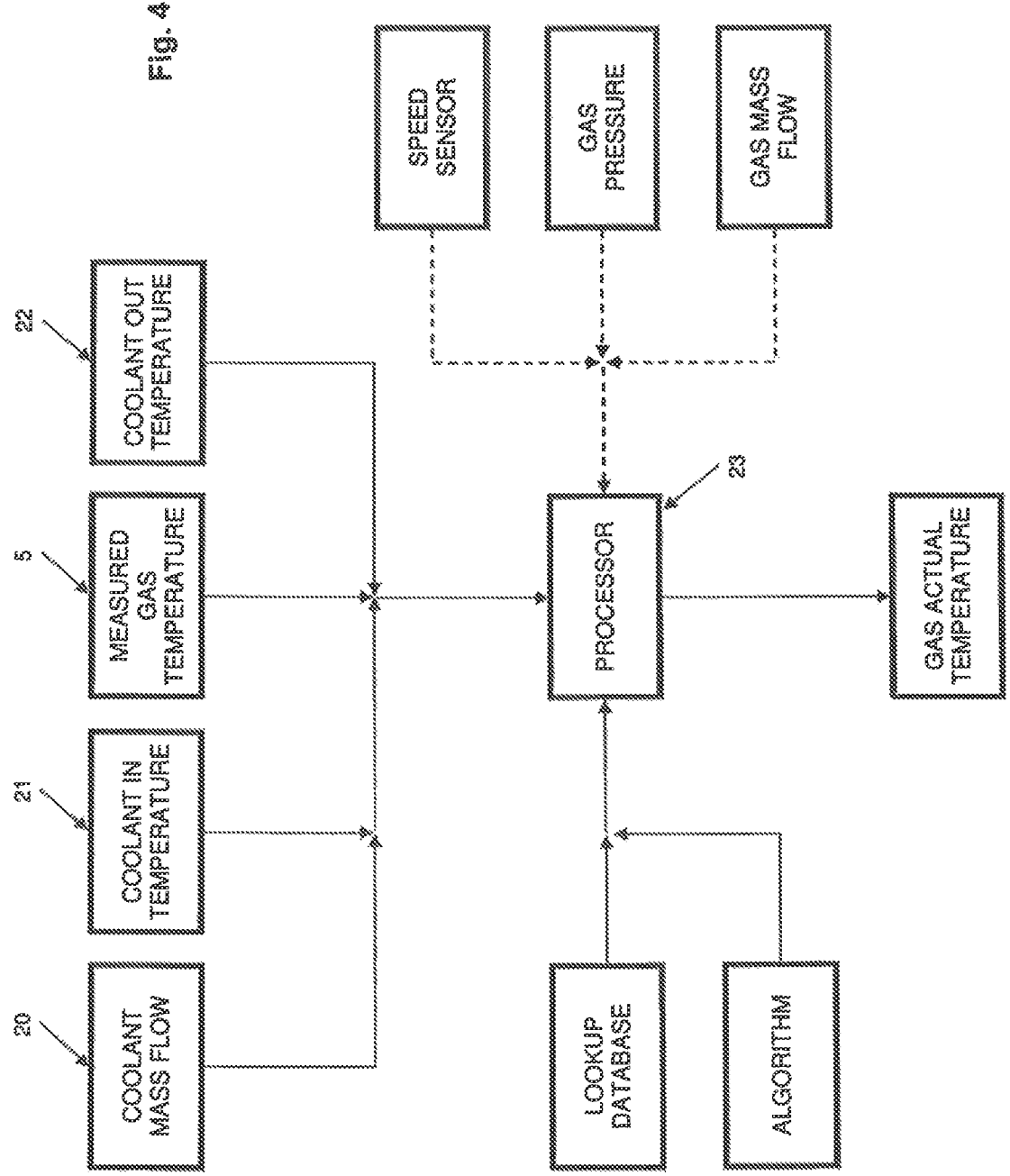

THERMOCOUPLE

RELATED APPLICATIONS

This application claims priority to British Application No. 1311174.5 filed Jun. 24, 2013, the teachings of which are herein incorporated by reference.

The present invention is concerned with a cooling arrangement for a thermocouple. Embodiments of the invention are particularly useful in conjunction with thermocouples used to sense the temperature of high temperature gases such as, for example, the gases in an engine (for example in a jet engine).

Thermocouples of the type described in EP0989393, EP1014059 and/or GB 2,406,967 are used to sense the temperature in a jet turbine. The temperature inside a turbine is measured as knowing the temperature allows one to improve or optimise control of the engine. Turbine temperature is an important parameter for any engine performance optimisation system. The temperature inside the turbine is also monitored to make sure it does not reach the engine's so-called redline temperature at which components or materials might fail. The redline temperature is the maximum safe running temperature or associated speed.

The temperatures inside the turbine stage of a jet engine are typically in excess of 1000° C. The continuous flow of gas to which a turbine is exposed can be at a temperature between 850° C. to 1700° C. This may be above the melting point of the materials used to make for example, the turbine blades so it is necessary to cool the blades. Turbine blades are typically cooled by creating a cooling boundary layer between the turbine surface and the hot gases. As described in EP 2 568 115 this may be done by providing hollow turbine blades with bleed holes around the blade leading edge, and feeding air from the compressor through the blade and onto the blade surface to create a cooling boundary layer between the blade surface and the hot gases.

The thermocouples used to monitor the temperature of the gases inside the turbine need to be able to cope with the very hot temperatures. High temperature thermocouples are typically platinum/rhodium thermocouples. Although they can operate at temperatures of up to about 1600° C., they are more expensive than, for example, K-type thermocouples. Furthermore, there is a drive to increase the operating temperature of jet engines as increasing the temperature increases fuel efficiency, boosts thrust and reduces emissions. As engine temperatures increase, there is an increasing need for thermocouples which can operate at temperatures higher than those defined by current material limits.

In parallel with the drive for the increased engine temperatures associated with lean burn engines, placing the turbine temperature sensing thermocouple closer to the combustor may improve the temperature measurement but also means that the thermocouple is in a hotter location and must therefore withstand higher temperatures.

There is therefore a need for a system for cooling thermocouples used to sense the temperature of high temperature gases.

The present invention provides a thermocouple probe arrangement including a thermocouple comprising two wires joined at a first sensing end to define a hot thermocouple function, at least a portion of the wires being in thermal communication with a cooling arrangement, the cooling arrangement having an inlet for coolant and an outlet for coolant, and wherein the thermocouple probe arrangement includes a first inlet temperature sensor for determining the temperature of the coolant as it enters the cooling arrangement, and a flow rate sensor for determining the flow rate of coolant passing through the cooling arrangement, and wherein the thermocouple probe arrangement includes connectors for connecting the output from the thermocouple, first inlet temperature sensor and the flow rate sensor to a correction data processor whereby the data processor can correct the temperature sensed by the thermocouple to take account of the effect of the cooling arrangement. The inventors have appreciated that embodiments of this arrangement may allow for improved accuracy in sensing temperature in a high temperature and hostile environment whilst allowing one to use cheaper thermocouples normally not suitable for high temperature and hostile environments, and/or to place thermocouples in hotter environments or locations.

Preferably the thermocouple probe arrangement is used for monitoring the temperature in a jet engine. As discussed above, there is a move towards higher jet engine temperatures to increase operating efficiency. Historically the temperature in jet engines has been sensed with K type thermocouples as these have been adequate for the historical operating temperatures. However, as temperatures increase K-type thermocouples become unreliable. A solution would be to simply replace the K-type thermocouples with thermocouples such as platinum-rhodium thermocouples which can operate at higher temperatures. However, thermocouples and other system elements used in aerospace applications must go through stringent qualifying tests (by the thermocouple manufacturer, the engine manufacturer and then the relevant aviation authority) of the thermocouple itself, its associated new electronics and the associated software, before they can be used. The cost of replacing the already tested and accepted K-type with an alternative high temperature thermocouple, such as a platinum-rhodium thermocouple, must therefore include both the cost of the more expensive thermocouple and the cost (and delay) associated with the necessary qualifying tests. The subject invention allows one to measure higher temperatures and/or locate thermocouples in higher temperature locations with the known and already tested thermocouples.

Preferably the thermocouple probe arrangement includes a probe head portion for mounting onto the casing of a gas turbine such as a jet engine, and wherein the connectors are part of the probe head portion and are to connect the probe to a data processor outside the gas turbine.

Preferably the cooling arrangement of the thermocouple probe arrangement includes a second outlet temperature sensor for determining the temperature of the coolant as it leaves the cooling arrangement, and the thermocouple probe arrangement includes a connector for connecting the output from the second outlet temperature sensor to the correction data processor. The inventors have appreciated that such an arrangement may result in improved and more accurate temperature sensing, and/or allow placement of the thermcouple probe arrangement in hotter more hostile conditions and thence closer to the point which temperature one is trying to determine. Cooling the thermocouple probe means that it can operate in a hotter environment. It is currently the situation that engine manufacturers wanting to determine Turbine Entry Temperature (TET) currently place the sensor downstream from the turbine entry in a cooler engine location and determine (either empirically or theoretically) what the corresponding TET (Turbine Entry Temperature) would be. For example, engine manufacturers may actually place the temperature sensing thermocouple probe tip further downstream in the turbine to measure the Turbine Gas Temperature (TGT) or Exhaust Gas Temperature (EGT) and thence determine the Turbine Entry Temperature using a look-up table may be determined empirically or theoretically for converting sensed Exhaust Gas Temperatures and Turbine Gas Temperatures to Turbine Entry Temperatures.

Preferably the cooling arrangement is a closed loop circuit.

Preferably the cooling arrangement is the evaporator stage of a phase-change refrigeration system. This is a particularly efficient cooling arrangement.

Preferably, the thermocouple probe includes the pair of thermocouple wires inside a sheath or casing, and a cooling jacket around the thermocouple probe, wherein the cooling jacket includes a pair of concentric tubes defining a return coolant circuit from the end of the probe proximal the connectors, to a portion of the probe distal from the connectors, and then back to the proximal end of the probe, and wherein the portion of the thermocouple probe containing the sensing end of the thermocouple projects from the cooling jacket. This is a simple and effective cooling construction.

Preferably the thermocouple probe arrangement includes two separate cooling arrangements, the first cooling arrangement being for cooling a portion of the thermocouple probe proximal the connectors, and the second cooling circuit being for cooling the first sensing end of the thermocouple. Such an arrangement allows for improved and more accurate temperature sensing as it is possible to more accurately determine the heat absorbed at or near the sensing tip of the thermocouple.

Preferably, the thermocouple wires are supported inside a mineral insulated cable, and the second cooling arrangement is a tube running through that mineral insulated cable.

Preferably the cooling arrangement includes means for supplying a gas coolant at a known pressure, flow and temperature to at least a portion of the surface of the thermocouple probe. In this alternative embodiment there is no need for a closed loop cooling circuit.

The invention also provides, in a second aspect, a method for determining the temperature in a high temperature environment such as a jet engine, the method comprising: providing a thermocouple to sense the temperature at its hot junction inside the jet engine; cooling at least a portion of the thermocouple inside the jet engine, by passing a coolant through an area in thermal communication with at least a portion of the thermocouple probe inside the jet engine; monitoring the supply temperature and supply flow of coolant to the thermocouple probe; and applying a compensation factor to the temperature sensed by the thermocouple, the compensation factor being determined or calculated from the supply temperature and flow of coolant to compensate for the effect of the coolant. The inventors have appreciated that such a embodiments of such a method may make for improved accuracy in sensing temperature in a high temperature and hostile environment whilst allowing one to use cheaper thermocouples normally not suitable for high temperature and hostile environments. The compensation factor may be determined empirically or theoretically.

Preferably the method includes the further step of monitoring the exit temperature of coolant from the thermocouple probe and in which the determining of the compensation factor also uses the exit temperature of coolant.

Preferably the step of applying the compensation factor includes comparing the temperature sensed by the thermocouple, the monitored coolant temperature or temperatures and the monitored coolant flow to an empirically determined look-up table. Creating an accurate theoretical model of the behaviour of the thermocouple system can be complicated and require significant processing. The inventors have appreciated that it may be advantageous and allow for reduced or simpler processing to empirically determine the relationship between the various system parameters on a test rig and use those empirically determined values to populate a multi-dimensional look-up table.

Preferably wherein the determining of the compensation factor includes determining the heat absorbed by the coolant using the function:

$$Q=cm\Delta T$$

where Q is the heat absorbed by or added to the coolant, c is the specific heat of the coolant, m is the mass of coolant which has flowed, and $\Delta T$ is the increase in temperature of the coolant between the inlet and outlet. The inventors have appreciated that it is possible to create a theoretical model of the system which can be used on its own or together with empirically determined system values to either populate a look-up table for subsequent live use, or to determine a compensation factor live as system parameters are sensed and determined.

Preferred embodiments of the invention will now be described by way of non-limiting example, with reference to the attached figures in which:

FIG. 1 illustrates a thermocouple sensor arrangement embodying aspects of the invention;

FIG. 2 is a cross-sectional view through the thermocouple arrangement of FIG. 1;

FIGS. 3a and 3b are, respectively, views of details A and B of FIG. 2;

FIG. 4 is a schematic diagram illustrating a preferred embodiment of the invention;

Figure 5:
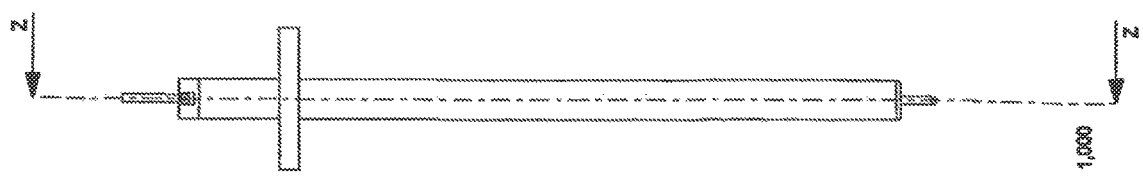
FIG. 5 illustrates an alternative thermocouple sensor arrangement embodying aspects of the invention

Referring to FIGS. 1, 2, 3 and 7, a thermocouple sensor arrangement 1 includes a thermocouple 2 of the known construction and made of two dissimilar wires 3, 4 connected at their distal ends at a hot junction to form temperature sensing end 5. The two dissimilar wires are connected at their end remote from the temperature sensing end 5 to sensor terminals (not shown) and thence to sensing circuitry in the known manner described in, for example EP 1 014 059. The thermocouple 2 may be, for example, one of the 684 range of thermocouples available from Weston Aerospace limited and used in Rolls-Royce Trent engines.

The thermocouple sensor has a mounting flange 7 for mounting to the portion of the engine casing surrounding a hole in an engine casing (not shown) so that, in use, a stem 10 of the sensor 1 with the distal temperature sensing end 5 extends into the engine. A sensor head located outside the engine has sensor terminals (not shown) for connection to the sensing circuitry 10 and/or data processing arrangements. A cooling jacket 12 is provided around the stem 10 of the sensor and a coolant connector head 13 is provided to connect the cooling jacket 12 to a supply of coolant via a coolant inlet 14 and a coolant outlet 15. The cooling circuit may be the evaporator stage of a phase-change refrigeration system. The cooling jacket 12 could be made of a nickel based material, optimised for thermal conduction. The cooling jacket material preferably is of a similar material to the thermocouple. A nickel based cooling jacket is therefore suitable for a K type thermocouple such as those used in the Weston Aerospace 684 range of thermocouples. K type thermocouples have one wire of chromel (90% nickel and 10% chromium) and the other of alumel (95% nickel, 2% manganese, 2% aluminium and 1% silicon).

The cooling jacket 12 is arranged around the known thermocouple probe 2 (see for example, GB 2,406,967. The cooling jacket 12 is defined by a first intermediate tube 16 immediately adjacent and around the thermocouple probe 2, and an outer casing 17 or tube 17 surrounding the intermediate tube 16 and closed at the distal end of the probe around the distal sensing end 5 of the thermocouple. The temperature sensing end 5 of the thermocouple extends out from the first tube 16 and outer casing or tube 17 which form the cooling jacket 12.

As shown in FIGS. 3a and 3b, the intermediate tube 16 and outer tube 17 define a coolant pathway 18 running from the coolant inlet 14, along the outside of the probe between the probe outer surface and the intermediate tube 16 through the distal connecting passage 19 (see FIG. 3) into the passage between the intermediate tube 16 and outer tube 17, and thence along the outside of the intermediate tube 16 between the outside of the intermediate tube 16 and the outer cooling tube 17 to the coolant outlet 15.

In use, heat is conducted from the tip or temperature sensing end 5 and coolant jacket 16, 17, 18 towards the mounting flange 7. Coolant flows towards the tip 5, out of the end of the intermediate tube then back inside the cooling jacket, collecting heat on the way.

The stem 10 of the probe is cooler as a result of the coolant flow and more heat can therefore also be removed from the sensing tip by conduction through the cooler stem such that the tip can survive in a hotter environment than would be the case without the cooled stem.

The heat energy collected by the coolant as it passes through the cooling circuit would have to be dumped after exiting the outlet 15 and before it returns to the coolant inlet 14 (in a closed loop cooling circuit). The heat would be dumped into a cooler zone via a second heat exchanger (not shown) before the coolant returns to the coolant inlet 14.

The effect of the flowing coolant will significantly affect the temperature of the sensing tip. In order to accurately determine the temperature of the gas stream in which the tip is placed, it is therefore necessary to compensate or adjust for the cooling effect produced by the flow of coolant through the cooling circuit defined by the intermediate tube and outer cooling jacket.

The magnitude or value of the cooling effect can be determined from the following coolant variables or parameters: specific heat capacity of coolant; coolant inlet and outlet temperatures as it, respectively passes, in and out of the device; mass flow rate of coolant; and pressure (especially for gaseous coolants). Other engine parameters and variables may have an effect and can also be used to correct or compensate for the effect of the coolant flow. These include: turbine rotor speed; pressure of gas in the turbine; and mass flow rate or velocity through the turbine of the turbine gas.

The theoretical model relating gas temperature (i.e. actual temperature) to the temperature sensed measured gas temperature by the sensing tip and taking account of the system variables listed above is a complicated one. Rather than calculate the actual gas temperature in real time, a preferred embodiment of the invention uses a multi-dimensional look-up table, which relates actual gas temperature to the system and coolant variables. The look-up table values can be calculated in advance as part of the sensor system calibration or set-up. Alternatively or additionally, the values in the look-up table could be determined empirically.

Referring to FIG. 4, the system includes:
a) a coolant mass flow sensor 20 to determine the mass flow rate of coolant through the cooling circuit;
b) a temperature sensor 21 at the coolant inlet 14 to determine the temperature at which coolant enters the cooling circuit;
c) the thermocouple sensing tip 5 to determine the measured gas temperature at the sensing tip; and
d) a temperature sensor 22 at the coolant outlet 15 to determine the temperature at which coolant leaves the cooling circuit.

The known specific heat capacity of the chosen coolant, together with the coolant mass flow rate, coolant inlet temperature and coolant outlet temperature can be used to determine the rate at which heat is absorbed by the coolant as it flows from the coolant inlet 14 to the outlet 15. The coolant may be air, another gas or liquid, and/or a combination of these. The coolant would have to cope with extreme temperatures (which can reach 1700° C. in a jet engine) to which the cooling system is subjected, and not change phase, or corrode the materials (nickel in the embodiments described in this application) used in the cooling circuit construction. The skilled man can readily identify a suitable coolant appropriate for the working conditions.

Sensors in the turbine also sense the speed of the turbine sensors, the pressure of the turbine gas and the mass flow of gas through the turbine.

The value determined by each of the coolant, thermocouple and turbine sensors are fed into a data processor 23 which uses a multi-dimensional look-up table and/or algorithm to produce a value for the actual gas temperature.

The specific heat absorbed by the coolant as it flows from the inlet to the outlet (assuming there is no phase change) is given by the equation:

$$Q = cm\Delta T \qquad (1)$$

Where Q is the heat absorbed by or added to the coolant, c is the specific heat of the coolant, m is the mass of coolant which has flowed, and $\Delta T$ is the increase in temperature of the coolant between the inlet and outlet.

The heat absorbed by the coolant can then be determined and a model or algorithm also developed or calculated from the known laws of physics, the likely working conditions and the properties of the coolant and other system materials, properties and dimensions to then calculate a compensation factor to apply to measured temperatures to thereby determine the actual temperature of the gas flowing through the turbine. Alternatively or together with the algorithm method, it is possible to carry out calibration measurements using the cooled thermocouple in a gas whose temperature is known or measured by an alternative method to thereby empirically create a multi-dimensional look-up table which relates measured gas temperature to actual gas temperature for different values of the other system parameters discussed above and sensed in the thermocouple system and turbine.

The embodiment described above with reference to FIGS. 1 to 3 cools the whole sensor probe stem 10 and does not distinguish between heat taken from the proximal end of the stem remote from the sensing tip, and heat taken from near or at the sensing tip thermocouple hot function.

Figure 7:
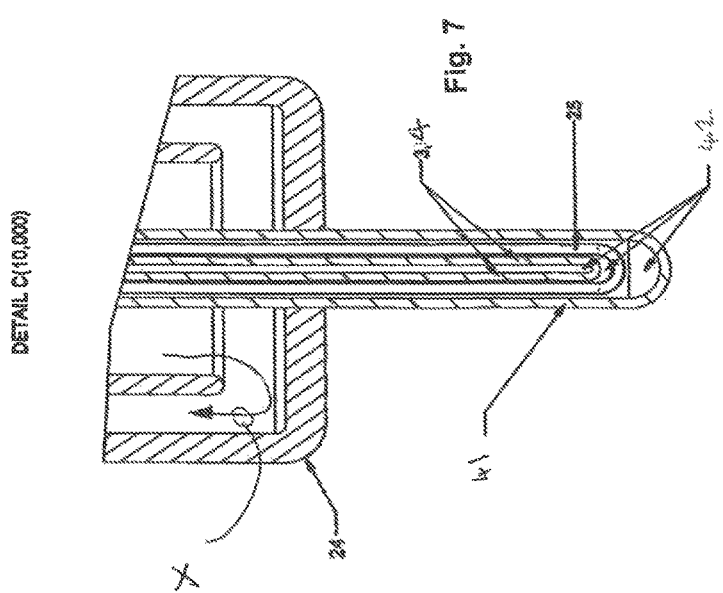
FIG. 7 is a view of detail C of FIG. 6.
Figure 6:
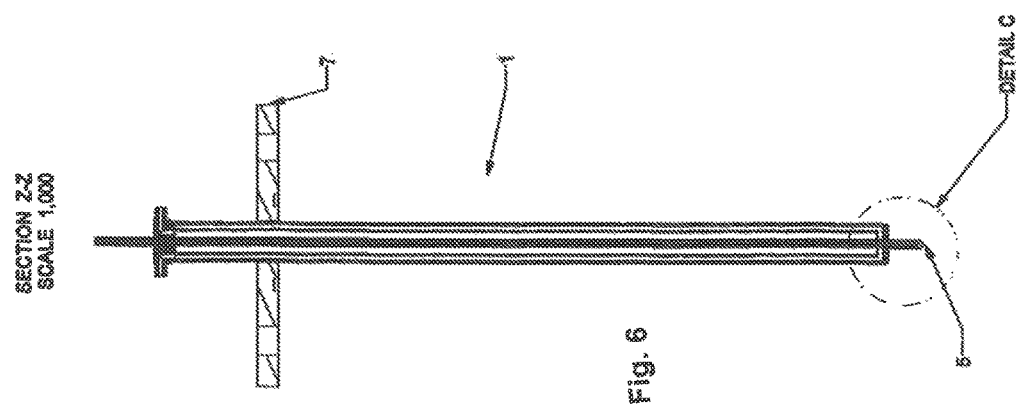
FIG. 6 is a cross-sectional view similar to that of FIG. 2, of an alternative thermocouple arrangement embodying aspects of the invention.

Referring to FIGS. 5, 6 and 7, in an alternative embodiment of the invention, two separate and distinct cooling circuits 24, 25 are provided. A first system cooling circuit 24 surrounds and cools the sensor probe stem, and a second tip cooling circuit 25 surrounds and cools the sensing tip.

The first system cooling circuit 24 may be of a similar construction to the cooling jacket construction described above in connection with FIGS. 1 to 3.

In the embodiment shown in FIGS. 5, 6 and 7, the thermocouple is a thermocouple of the 684 range of Weston Aerospace thermocouples in which the two different thermocouple wires are inside a mineral insulated (MI) sheath 41 and the cavities inside the sheath and around the thermocouple wires are filed with an insulant 42. The tip cooling circuit is a microbore tube or pipe which runs inside the sheath and outside the thermocouple wires so that coolant flows in the direction shown in arrow X. The coolant tube does not completely surround the thermocouple in the embodiment shown in FIGS. 5, 6 and 7. It could be twisted around the tube in an alternative embodiment so that it surrounds a larger portion of the thermocouple wires.

While the embodiments described above with reference to FIGS. 1 to 7 describe closed loop cooling systems, alternative embodiments could include additional or alternative cooling methodologies including but not limited to a cooling boundary layer between the thermocouple surface and the hot gases flowing over it. This could be done via bleed holes in the outer surface of an external cooling jacket placed around the thermocouple probe where cooler bleed air at a known pressure, flow and temperature is injected into the aspirated cooling jacket aspirated into the main gas flow to provide a set amount of cooling that could be characterised (and hence produce a look-up table for converting temperatures sensed by the cooled arrangements to real temperatures by compensating for the effect of the cooling arrangement) at different hot gas and bleed air conditions. A further alternative could vent bleed air or liquid out of the sensing end of the probe or cooling jacket rather than having a coolant outlet in the head end of the probe and a return coolant pathway taking coolant (e.g. air) from the end of the cooling jacket near the sensing end of the probe back to an outlet at the head end of the probe. The temperature and flow rate at the coolant inlet would be sensed or otherwise determined and hence a set amount of cooling would be provided at defined conditions or operating parameters and that cooling could be taken account of.

The invention claimed is:

1. A thermocouple probe arrangement including a thermocouple comprising two wires joined at a first sensing end to define a hot thermocouple function, at least a portion of the wires being in thermal communication with a cooling arrangement, the cooling arrangement having an inlet for coolant and an outlet for coolant, and wherein the thermocouple probe arrangement includes a first inlet temperature sensor for determining temperature of the coolant entering the cooling arrangement, and a flow rate sensor for determining flow rate of the coolant passing through the cooling arrangement, and wherein the thermocouple probe arrangement includes connectors for connecting outputs from the thermocouple, the first inlet temperature sensor, and the flow rate sensor to a correction data processor whereby the correction data processor is configured to correct the temperature sensed by the thermocouple to take account of effect of the cooling arrangement.

2. The thermocouple probe arrangement according to claim 1 including a probe head portion for mounting onto a casing of a gas turbine, and wherein the connectors are part of the probe head portion and connect the probe head portion to the correction data processor outside the gas turbine.

3. The thermocouple probe arrangement according to claim 1 wherein the cooling arrangement includes a second outlet temperature sensor for determining the temperature of the coolant leaving the cooling arrangement, and the thermocouple probe arrangement includes a further connector for connecting an output from the second outlet temperature sensor to the correction data processor.

4. The thermocouple probe arrangement according to claim 1 wherein the cooling arrangement is a closed loop circuit.

5. The thermocouple probe arrangement according to claim 4 wherein the cooling arrangement is an evaporator stage of a phase-change refrigeration system.

6. The thermocouple probe arrangement according to claim 1 wherein the thermocouple comprises a probe, and wherein the two wires are arranged inside a sheath or casing, and further comprising a cooling jacket around the thermocouple probe, wherein the cooling jacket includes a pair of concentric tubes defining a return coolant circuit from an end of the thermocouple probe proximal the connectors, to a portion of the thermocouple probe distal from the connectors, and then back to a proximal end of the thermocouple probe, and wherein the portion of the thermocouple probe containing the first sensing end projects from a distal end of the cooling jacket.

7. The thermocouple probe arrangement according to claim 1 wherein the cooling arrangement is a first cooling arrangement for cooling a portion of the thermocouple probe proximal the connectors, and further comprising a second cooling arrangement for cooling the first sensing end of the thermocouple.

8. The thermocouple probe according to claim 7 wherein the two wires are supported inside a mineral insulated cable, and the second cooling arrangement is a tube running through the mineral insulated cable.

9. The thermocouple probe arrangement according to claim 1 wherein the cooling arrangement includes a gas coolant supply for supplying gas coolant at a known pressure, flow and temperature to at least a portion of a surface of the thermocouple.

10. A cooled thermocouple probe arrangement according to claim 1.

11. A cooled thermocouple probe arrangement including a thermocouple comprising two wires joined at a first sensing end to define a hot thermocouple function, at least a portion of the two wires being in thermal communication with a cooling arrangement, the cooling arrangement having an inlet for coolant and an outlet for coolant, and wherein the cooled thermocouple probe arrangement includes a first inlet temperature sensor for determining the temperature of the coolant entering the cooling arrangement, and a flow rate sensor for determining the flow rate of coolant passing through the cooling arrangement, and wherein the cooled thermocouple probe arrangement includes connectors for connecting outputs from the thermocouple, the first inlet temperature sensor and the flow rate sensor to a correction data processor whereby the correction data processor corrects the temperature sensed by the thermocouple to take account of effect of the cooling arrangement and wherein the two wires are arranged inside a sheath or casing, and a cooling jacket is provided around the thermocouple, the thermocouple comprising a probe, wherein the cooling jacket includes a pair of concentric tubes defining a return coolant circuit from an end of the thermocouple probe proximal the connectors, to a portion of the thermocouple probe distal from the connectors, and then back to a proximal end of the thermocouple probe, and wherein the portion of the thermocouple probe containing the first sensing end projects from a distal end of the cooling jacket.

12. The thermocouple probe arrangement according to claim 1 including a probe head portion for mounting onto a casing of a jet engine.

13. The thermocouple probe arrangement according to claim 11 including a probe head portion for mounting onto a casing of a jet engine.

14. The thermocouple probe arrangement according to claim 11 wherein the high temperature environment is a jet engine.

* * * * *